(12) United States Patent
Burka et al.

(10) Patent No.: US 9,092,237 B2
(45) Date of Patent: Jul. 28, 2015

(54) SERIALIZATION OF PRE-INITIALIZED OBJECTS

(75) Inventors: Peter W. Burka, Ottawa (CA); Daniel J. Heidinga, Ottawa (CA); Karl M. Taylor, Kanata (CA); Olivier P. Thomann, Gatineau (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 69 days.

(21) Appl. No.: 13/589,855

(22) Filed: Aug. 20, 2012

(65) Prior Publication Data

US 2013/0139134 A1 May 30, 2013

(30) Foreign Application Priority Data

Nov. 24, 2011 (CA) ..................................... 2759516

(51) Int. Cl.
*G06F 9/45* (2006.01)
*G06F 9/44* (2006.01)
(52) U.S. Cl.
CPC .............. G06F 9/4435 (2013.01); G06F 8/443 (2013.01); *G06F 8/24* (2013.01)
(58) Field of Classification Search
CPC .............. G06F 7/78; G06F 8/00–8/78; G06F 9/44–9/455; G06F 11/36
USPC .................................................. 717/100–178
See application file for complete search history.

(56) References Cited

U.S. PATENT DOCUMENTS

| 6,061,520 | A | 5/2000 | Yellin et al. |
| 6,530,080 | B2 | 3/2003 | Fresko et al. |
| 6,832,369 | B1 | 12/2004 | Kryka et al. |
| 6,934,944 | B2 | 8/2005 | McGuire |
| 6,996,813 | B1 | 2/2006 | Sokolov et al. |
| 7,051,323 | B2 | 5/2006 | Lam et al. |
| 7,096,467 | B2 | 8/2006 | Wallman et al. |
| 7,210,130 | B2 | 4/2007 | Fairweather |
| 7,340,730 | B2 | 3/2008 | Awkright et al. |
| 7,356,811 | B2 | 4/2008 | Burka et al. |
| 7,426,720 | B1 | 9/2008 | Fresko et al. |
| 7,526,760 | B1 | 4/2009 | Daynes et al. |
| 7,650,600 | B2 | 1/2010 | King et al. |
| 7,665,075 | B1 | 2/2010 | Daynes et al. |
| 7,681,186 | B2 | 3/2010 | Chang et al. |
| 7,788,649 | B1 * | 8/2010 | Kunisetty et al. ............. 717/137 |

(Continued)

OTHER PUBLICATIONS

Java documentations http://docs.oracle.com.*

(Continued)

*Primary Examiner* — Wei Zhen
*Assistant Examiner* — Zhan Chen
(74) *Attorney, Agent, or Firm* — Marcia L. Doubet

(57) ABSTRACT

An illustrative embodiment for serialization of pre-initialized objects receives a source code definition of a class, identifies a set of constants associated with the class in the source code to form a set of identified constants, creates a result object corresponding to each constant in the set of identified constants, and compiles the source code into a compiled form of the class. The illustrative embodiment further serializes each result object into a resource file associated with the class to form a set of serialized objects and replaces, in the compiled form of the class, each reference to a respective constant associated with the class from the set of identified constants with a corresponding dynamic instruction using a respective serialized object in the set of serialized objects.

20 Claims, 12 Drawing Sheets

(56) References Cited

U.S. PATENT DOCUMENTS

| | | | |
|---|---|---|---|
| 8,099,723 | B2 | 1/2012 | Burka et al. |
| 2003/0009743 | A1 | 1/2003 | Fresko et al. |
| 2003/0135850 | A1* | 7/2003 | Miloushev et al. ........... 717/165 |
| 2003/0172194 | A1 | 9/2003 | Plummer et al. |
| 2005/0071809 | A1 | 3/2005 | Pulley |
| 2005/0262493 | A1* | 11/2005 | Schmidt et al. ............... 717/164 |
| 2006/0010424 | A1 | 1/2006 | Burka et al. |
| 2006/0225045 | A1* | 10/2006 | Bracha .......................... 717/127 |
| 2007/0256087 | A1* | 11/2007 | Forin et al. .................... 719/332 |
| 2008/0189691 | A1 | 8/2008 | Burka et al. |
| 2008/0229285 | A1* | 9/2008 | Housser ........................ 717/125 |
| 2011/0283256 | A1* | 11/2011 | Raundahl Gregersen et al. .............................. 717/108 |
| 2012/0167122 | A1* | 6/2012 | Koskimies .................... 719/328 |
| 2013/0042235 | A1 | 2/2013 | Burka et al. |

OTHER PUBLICATIONS

Java Documentation, Java plateform SE 7.*

Breg et al., Java Virutal Machine Support for Object Serialization, 2001.*

Castanos et al., On the Benefits and Pitfalls of Extending a Statically Typed Language JIT Compiler for Dyanmic Scripting Languages, 2012.*

Titzer, Ben L., et al., "The ExoVM System for Automatic VM and Application Reduction", PLDI '07, Proceedings of the 2007 ACM SIGPLAN conference on Programming language design and implementation, Jun. 11-13, 2007, San Diego, CA, USA. vol. 42, Issue 6. pp. 352-362.

Auerbach, Joshua, et al., "Design and Implementation of a Comprehensive Real-time Java Virtual Machine", EMSOFT '07, Proceedings of the 7th ACN & IEEE International Conference on Embedded Software, Sep. 30-Oct. 3, 2007, Salzburg, Austria. 10 pages.

Sridhar, Nigamanth, "Reaping More from Lazy Initialization Using Dynamic Reconfiguration", Proceedings of the Resolve Workshop 2002, Columbus, OH, Jun. 17-19, 2002. 5 pages.

Manson, Jeremy, et al., "JSR 133 (Java Memory Model) FAQ", Feb. 2004, Internet-published article printed from http://www.cs.umd.edu/~pugh/java/memoryModel/jsr-133-faq.html#dcl on Jun. 4, 2012. 9 pages.

Fusco, Mario, "The first Drop of Java—Lazy initialization strategies", Jan. 6, 2009, Internet-published article printed from http://groups.google.com/group/juglugano/msg/7705b4850dc1fd63?pli=1 on Jun. 4, 2012. 5 pages.

Privat, et al, "Link-time static analysis for efficient separate compilation of object-oriented languages", Proceedings of the 2005 ACM SIGPLAN-SIGSOFT Workshop on Program Analysis for Software Tools and Engineering, PASTE'05, Lisbon, Portugal, Sep. 5-6, 2005. 8 pages.

Peter W. Bukra, et al., U.S. Appl. No. 13/207,205, filed Aug. 10, 2011, Office Action, Jan. 22, 2014, 9 pages.

"The Structure of the Java Virtual Machine", Chapter 3 of The Java™ Virtual Machine Specification, 1999, Sun Microsystems, Inc. Printed from http://docs.oracle.com/javase/specs/jvms/se5.0/html/Overview.doc.html on Feb. 16, 2014. 25 pages.

"The class File Format", Chapter 4 of the Java™ Virtual Machine Specification, 1999, Sun Microsystems, Inc. Printed from http://docs.oracle.com/javase/specs/jvms/se5.0/html/ClassFile.doc.html on Feb. 16, 2014. 22 pages.

"Loading, Linking, and Initializing", Chapter 5 of the Java™ Virtual Machine Specification, 1999, Sun Microsystems, Inc. Printed from http://docs.oracle.com/javase/specs/jvms/se5.0/html/ConstantPool.doc.html on Feb. 16, 2014. 13 pages.

Kats, Lennart, "Supporting Language Extension and Separate Compilation by Mixing Java and Bytecode", MSc Thesis, Center for Software Technology, Institute of Information and Computing Sciences, Utrecht University, Aug. 2007. Utrecht, The Netherlands. 99 pages.

* cited by examiner

Initialization system 300

FIG. 6

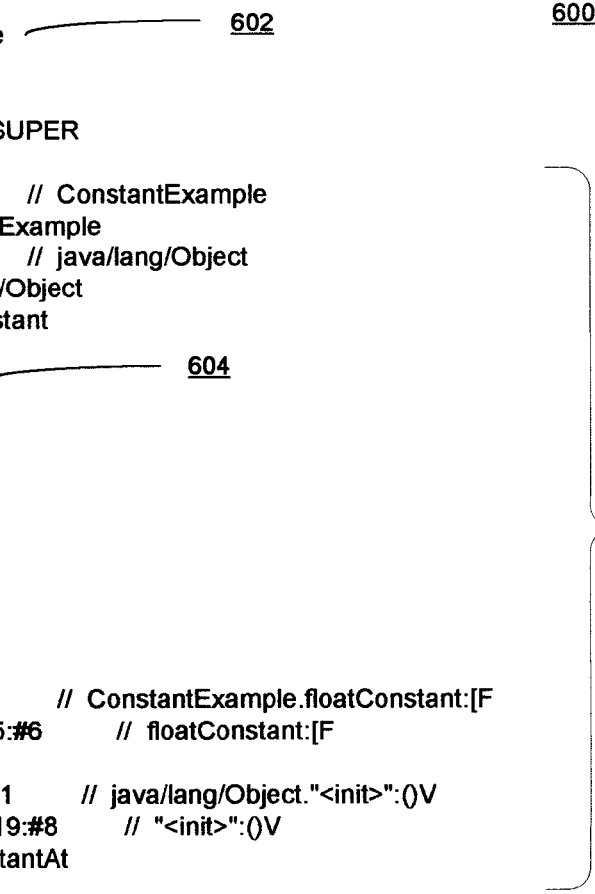

```
                                            602                  600
public class ConstantExample
  minor version: 0
  major version: 51
  flags: ACC_PUBLIC, ACC_SUPER
Constant pool:
  #1 = Class        #2           // ConstantExample
  #2 = Utf8         ConstantExample
  #3 = Class        #4           // java/lang/Object
  #4 = Utf8         java/lang/Object
  #5 = Utf8         floatConstant
  #6 = Utf8         [F
  #7 = Utf8         <clinit>            604
  #8 = Utf8         ()V
  #9 = Utf8         Code
  #10 = Float       1.1f
  #11 = Float       2.2f
  #12 = Float       3.3f                                  606
  #13 = Float       4.4f
  #14 = Float       5.5f
  #15 = Float       6.6f
  #16 = Float       7.7f
  #17 = Fieldref    #1.#18       // ConstantExample.floatConstant:[F
  #18 = NameAndType #5:#6        // floatConstant:[F
  #19 = Utf8        <init>
  #20 = Methodref   #3.#21       // java/lang/Object."<init>":()V
  #21 = NameAndType #19:#8       // "<init>":()V
  #22 = Utf8        getConstantAt
  #23 = Utf8        (I)F
{
```

FIG. 6 cont.

```
{
  static float[] floatConstant;
    flags: ACC_STATIC static {};
    flags: ACC_STATIC
    Code:
      stack=4, locals=0, args_size=0
        0: bipush      7
        2: newarray    float
        4: dup
        5: iconst_0
        6: ldc         #10          // float 1.1f
        8: fastore
        9: dup
       10: iconst_1
       11: ldc         #11          // float 2.2f
       13: fastore
       14: dup
       15: iconst_2
       16: ldc         #12          // float 3.3f
       18: fastore
       19: dup
       20: iconst_3
       21: ldc         #13          // float 4.4f
       23: fastore
       24: dup
       25: iconst_4
       26: ldc         #14          // float 5.5f
       28: fastore
       29: dup
       30: iconst_5
       31: ldc         #15          // float 6.6f
       33: fastore
       34: dup
       35: bipush      6
       37: ldc         #16          // float 7.7f
       39: fastore
       40: putstatic   #17          // Field floatConstant:[F
       43: return
```

```
    public static float getConstantAt(int);                    610
    flags: ACC_PUBLIC, ACC_STATIC
    Code:
      stack=2, locals=1, args_size=1
        0: getstatic    #17        // Field floatConstant:[F
        3: iload_0                                    612
        4: faload
        5: freturn
}
```

FIG. 7

```
public class ConstantExample                           702
  BootstrapMethods:                                               704
    0: #17 invokestatic
SerializedConstantHelpers.constant_bootstrap:(Ljava/lang/invoke/MethodHandles$Lookup;Ljava/lang/
String;Ljava/lang/invoke/MethodType;I)Ljava/lang/invoke/Constant
CallSite;
    Method arguments:
      #18 0                                                                            700
  minor version: 0
  major version: 51
  flags: ACC_PUBLIC, ACC_SUPER
Constant pool:
  #1 = Utf8            ConstantExample
  #2 = Class           #1          // ConstantExample
  #3 = Utf8            java/lang/Object
  #4 = Class           #3          // java/lang/Object
  #5 = Utf8            <init>
  #6 = Utf8            ()V
  #7 = NameAndType     #5:#6       // "<init>":()V
  #8 = Methodref       #4.#7       // java/lang/Object."<init>":()V
  #9 = Utf8            getConstantAt
  #10 = Utf8           (I)F
  #11 = Utf8           SerializedConstantHelpers
  #12 = Class          #11         // SerializedConstantHelpers
  #13 = Utf8           constant_bootstrap
  #14 = Utf8           (Ljava/lang/invoke/MethodHandles$Lookup;Ljava/lang/String;Ljava/lang/invoke/
MethodType;I)Ljava/lang/invoke/ConstantCallSite;
  #15 = NameAndType    #13:#14     // constant_bootstrap:(Ljava/lang/invoke/                    706
MethodHandles$Lookup;Ljava/lang/String;Ljava/lang/invoke/MethodType;I)Ljava/lang/invoke/
ConstantCallSite;
  #16 = Methodref      #12.#15     // SerializedConstantHelpers.constant_bootstrap:(Ljava/lang/invoke/
MethodHandles$Lookup;Ljava/lang/String;Ljava/lang/invoke/MethodType;I)Ljava/lang/invoke/
ConstantCallSite;
  #17 = MethodHandle   #6:#16      // invokestatic
SerializedConstantHelpers.constant_bootstrap:(Ljava/lang/invoke/MethodHandles$Lookup;Ljava/lang/
String;Ljava/lang/invoke/MethodType;I)Ljava/lang/invoke/ConstantCallSite;
  #18 = Integer        0
  #19 = Utf8           ConstantExample_serialized
  #20 = Utf8           ()F
  #21 = NameAndType    #19:#20     // ConstantExample_serialized:()F      712
  #22 = InvokeDynamic  #0:#21      // #0:ConstantExample_serialized:()F
  #23 = Utf8           Code
  #24 = Utf8           BootstrapMethods
{
```

FIG. 7 cont.

```
public static float getConstantAt(int);  ╱──── 710
    flags: ACC_PUBLIC, ACC_STATIC
    Code:
        stack=2, locals=1, args_size=1
            0: invokedynamic #22, 0      // InvokeDynamic #0:ConstantExample_serialized:()[F
            5: iload_0
            6: faload
            7: freturn
}
```

FIG. 8

800 public class ChecksumExample ⸺ 802
  BootstrapMethods: ⸺⸺⸺⸺⸺⸺⸺⸺⸺⸺⸺ 804
    0: #17 invokestatic
SerializedConstantHelpers.constant_bootstrap:(Ljava/lang/invoke/MethodHandles$Lookup;Ljava/lang/String;Ljava/lang/invoke/MethodType;ILjava/lang/String;)Ljava/lang/invoke/ConstantCallSite;
    Method arguments: ⸺⸺⸺⸺⸺⸺⸺ 806
      #18 0                    // index of serialized constant
      #20 fd188f848e3befbd3b5ba7b525508067     // checksum used by the deserialization process
minor version: 0
major version: 51 ⸺⸺⸺⸺⸺ 808
flags: ACC_PUBLIC, ACC_SUPER
Constant pool:
  #1 = Utf8         ChecksumExample                                     810
  #2 = Class        #1       // ChecksumExample
  #3 = Utf8         java/lang/Object
  #4 = Class        #3       // java/lang/Object
  #5 = Utf8         <init>
  #6 = Utf8         ()V
  #7 = NameAndType    #5:#6    // "<init>":()V
  #8 = Methodref      #4.#7    // java/lang/Object."<init>":()V
  #9 = Utf8         getConstantAt
  #10 = Utf8        (I)F
  #11 = Utf8        SerializedConstantHelpers
  #12 = Class       #11     // SerializedConstantHelpers
  #13 = Utf8        constant_bootstrap
  #14 = Utf8        (Ljava/lang/invoke/MethodHandles$Lookup;Ljava/lang/String;Ljava/lang/invoke/MethodType;ILjava/lang/String;)Ljava/lang/invoke/ConstantCallSite;
  #15 = NameAndType   #13:#14    // constant_bootstrap:(Ljava/lang/invoke/MethodHandles$Lookup;Ljava/lang/String;Ljava/lang/invoke/MethodType;ILjava/lang/String;)Ljava/lang/invoke/ConstantCallSite;
  #16 = Methodref     #12.#15    // SerializedConstantHelpers.constant_bootstrap:(Ljava/lang/invoke/MethodHandles$Lookup;Ljava/lang/String;Ljava/lang/invoke/MethodType;ILjava/lang/String;)Ljava/lang/invoke/ConstantCallSite;
  #17 = MethodHandle   #6:#16    // invokestatic
SerializedConstantHelpers.constant_bootstrap:(Ljava/lang/invoke/MethodHandles$Lookup;Ljava/lang/String;Ljava/lang/invoke/MethodType;ILjava/lang/String;)Ljava/lang/invoke/ConstantCallSite;
  #18 = Integer      0
  #19 = Utf8        fd188f848e3befbd3b5ba7b525508067
  #20 = String      #19     // fd188f848e3befbd3b5ba7b525508067
  #21 = Utf8        ChecksumExample_serialized
  #22 = Utf8        ()[F
  #23 = NameAndType   #21:#22    // ChecksumExample_serialized:()[F
  #24 = InvokeDynamic  #0:#23    // #0:ChecksumExample_serialized:()[F
  #25 = Utf8        Code
  #26 = Utf8        BootstrapMethods
{

FIG. 8 cont.

```
public static float getConstantAt(int);             812
  flags: ACC_PUBLIC, ACC_STATIC
  Code:
    stack=2, locals=1, args_size=1
      0: invokedynamic #24, 0      // InvokeDynamic #0:ChecksumExample_serialized:()[F
      5: iload_0                                          816
      6: faload
      7: freturn
}
```

SERIALIZATION OF PRE-INITIALIZED OBJECTS

CROSS REFERENCE TO RELATED APPLICATIONS

The present application claims priority of co-pending Canadian patent application 2759516, filed on Nov. 24, 2011, which in turn is related to co-pending non-provisional U.S. application Ser. No. 13/207,205, filed Aug. 10, 2011.

BACKGROUND

This disclosure relates generally to object initialization in a data processing system and more specifically to serialization of pre-initialized objects in the data processing system.

The Java® programming environment is one example of a managed runtime, which currently lacks a way of specifying array literals (a form of constant) and requires a large amount of execution time to initialize this type of object. There are many objects in Java classes that are essentially constants but typically there is no way to define these objects in a Constant-Pool associated with a specific class. ("Java" and all Java-based trademarks and logos are trademarks of Oracle Corporation, and/or its affiliates, in the United States, other countries, or both.)

Lazy initialization as implemented by the Java programming model is typically bug prone and difficult to apply correctly. Current solutions to this type of problem typically hide the data in a class using an initialization on demand holder idiom. The initialization on demand holder utilization is typically a poor solution because the proposed technique requires loading an additional class and is only applicable to use with static fields. See "JSR 133 (Java Memory Model) FAQ", an article by Jeremy Manson and Brian Goetz dated February, 2004, where this is discussed.

In another example, a double-checked locking idiom is used as a solution, which typically comprises many lines of code and is often implemented incorrectly. However, the pattern, as first introduced, was incorrectly defined and accordingly caused many threading issues. See "The first Drop of Java—Lazy initialization strategies", an article by Mario Fusco dated Jan. 6, 2009, where this is discussed.

Current solutions create and load constants regardless of whether the constant is actually used. The current solutions typically require additional classes and are therefore heavy weight solutions.

BRIEF SUMMARY

According to one embodiment of the present invention, a computer-implemented process for serialization of pre-initialized objects receives a source code definition of a class, identifies a set of constants associated with the class in the source code to form a set of identified constants, creates a result object corresponding to each constant in the set of identified constants, and compiles the source code into a compiled form of the class. The computer-implemented process further serializes each result object into a resource file associated with the class to form a set of serialized objects and replaces, in the compiled form of the class, each reference to a respective constant associated with the class from the set of identified constants with a corresponding dynamic instruction using a respective serialized object in the set of serialized objects.

Embodiments of the present invention may be provided as methods, systems (apparatus), or computer program products.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

FIG. 6 is a textual representation of a class file compilation, in accordance with various embodiments of the disclosure;

FIG. 7 is a textual representation of a class file compilation using the initialization system of FIG. 3, in accordance with various embodiments of the disclosure;

FIG. 8 is a textual representation of a class file compilation using the initialization system of FIG. 3, including a checksum, in accordance with various embodiments of the disclosure.

DETAILED DESCRIPTION

Figure 1:
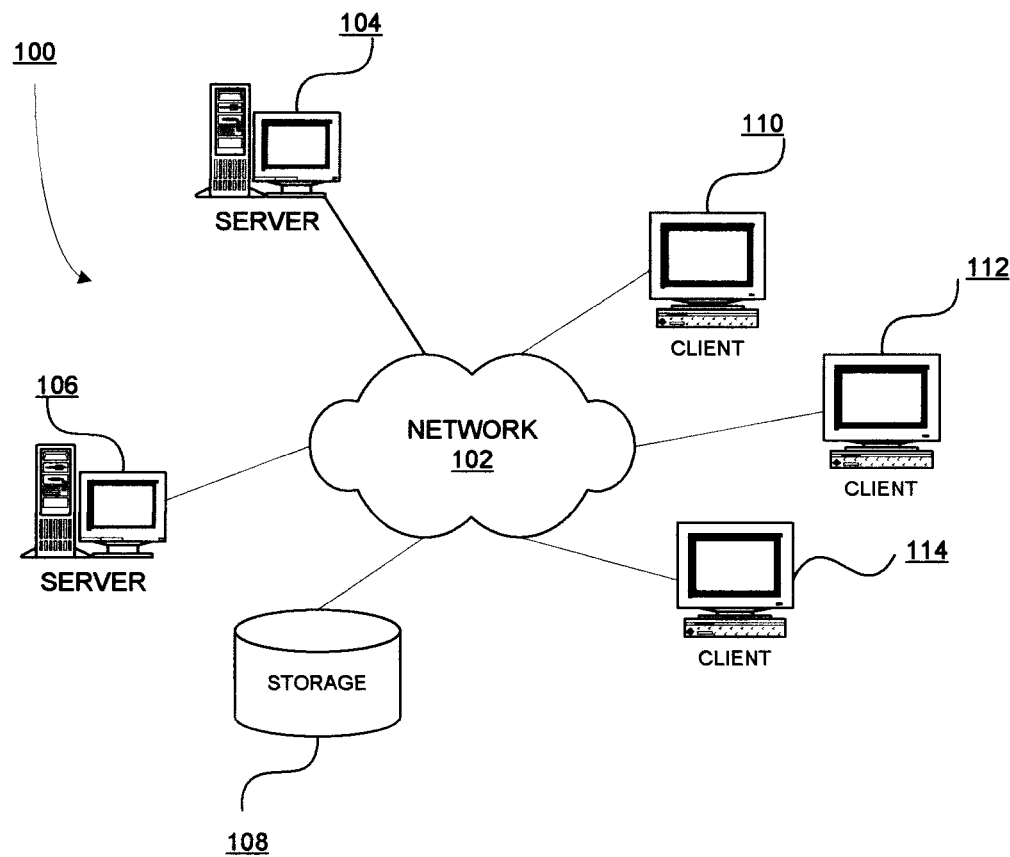
FIG. 1 is a block diagram of an exemplary network data processing system operable for various embodiments of the disclosure.

Although an illustrative implementation of one or more embodiments is provided below, the disclosed systems, computer program products, and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, radio frequency (RF), etc. or any suitable combination of the foregoing.

Computer program code for carrying out operations for aspects of the present disclosure may be written in any combination of one or more programming languages, including an object-oriented programming language such as Java®, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
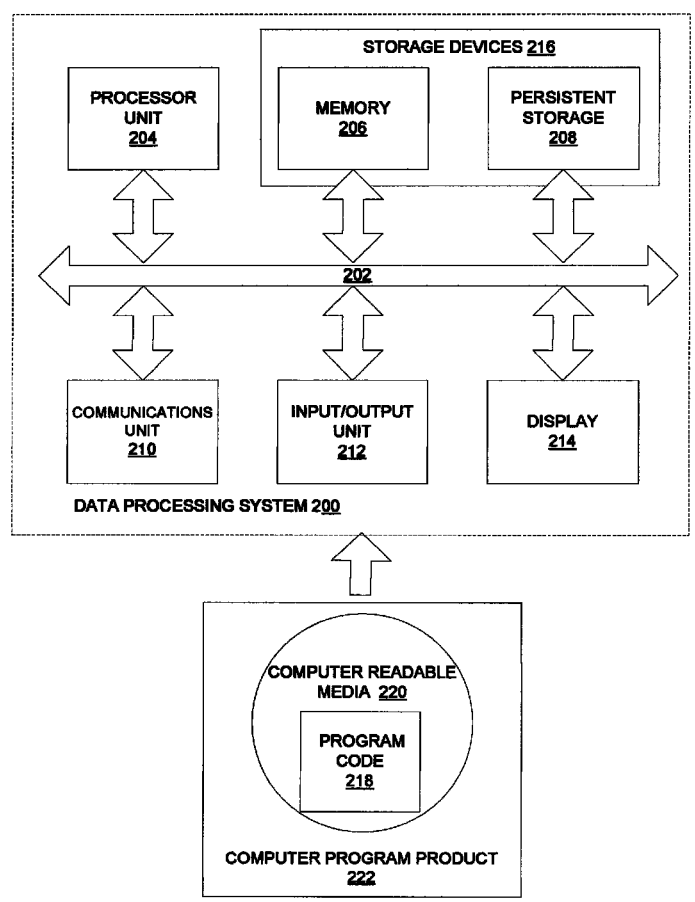
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer-usable program code, or computer-readable program code that may be read and executed by a processor in processor unit 204. The program code in the different embodiments may be embodied on different physical or tangible computer-readable storage media, such as memory 206 or persistent storage 208.

Program code 218 is located in a functional form on computer-readable storage media 220 that is selectively removable and may be loaded onto or transferred to data processing system 200 for execution by processor unit 204. Program code 218 and computer-readable storage media 220 form computer program product 222 in these examples. In one example, computer-readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable storage media 220 also may take the form of a persistent storage, such as a hard drive, a thumb drive, or a flash memory that is connected to data processing system 200. The tangible form of computer-readable storage media 220 is also referred to as computer-recordable storage media. In some instances, computer-readable storage media 220 may not be removable.

Alternatively, program code 218 may be transferred to data processing system 200 from computer-readable storage media 220 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer-readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for serialization of pre-initialized objects is presented. Processor unit 204 receives source code including definitions for a class through communications unit 210, input/output unit 212, storage devices 216, or through network 102 of network data processing system 100 of FIG. 1. Processor unit 204 identifies a set of constants associated with the class in the source code to form a set of identified constants, maintained in storage devices 216; creates a result object corresponding to each constant in the set of identified constants; and compiles the source code into compiled code including the class. Processor unit 204 further serializes each result object into a resource file, maintained in storage devices 216, associated with the class to form a set of serialized objects and replaces, in the compiled code maintained in storage devices 216, each reference to a respective constant associated with the class from the set of identified constants with a corresponding dynamic instruction using a respective serialized object in the set of serialized objects.

Figure 3:
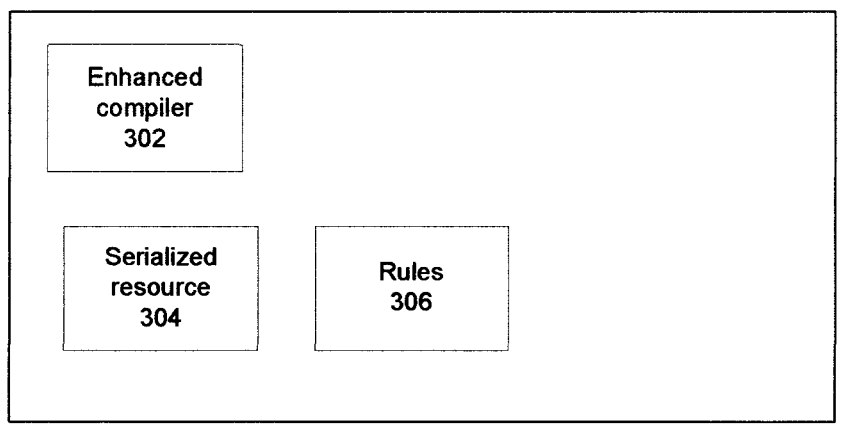
FIG. 3 is a block diagram of an initialization system, in accordance with various embodiments of the disclosure.

With reference to FIG. 3, a block diagram of an initialization system in accordance with various embodiments of the disclosure is presented. Initialization system 300 is an example of a system of components used to pre-initialize a set of objects into a resulting set of objects, which are serialized into a resource for subsequent use.

Initialization system 300 leverages support of an underlying data processing system such as data processing system 200 of FIG. 2 or server 104 of network data processing system 100 of FIG. 1. In one illustrative embodiment, initialization system 300 includes a number of components, comprising enhanced compiler 302, serialized resource 304, and rules 306.

Many objects within Java classes are essentially constants, however there is no capability to define the particular objects as constants in a ConstantPool associated with the class. An embodiment of the disclosed process provides a capability to recognize these constants, using rules 306, while compiling the class with enhanced compiler 302; create a resulting object at compile time, where possible; and serialize the resulting object into a resource file, shown as serialized resource 304, that accompanies the class file.

Enhanced compiler 302 replaces references to identified constants in the Java bytecode with dynamic bytecode, using instructions such as invokedynamic (contained in proposed Java specification request JSR 292, which is available on the Internet from Oracle Corporation in the discussions of the Java Community Process) or ldbl (where the ldbl instruction is described in co-pending U.S. application Ser. No. 13/207,205, filed Aug. 10, 2011) to enable bootstrapping of a respective constant on first use. For example, use of a replacement instruction of invokedynamic for a referenced constant includes a parameter indicating a constant pool entry to use. The constant pool entry contains information including which resource (such as serialized resource 304) to use, which specific entry within the resource, and optionally a checksum value.

Rules 306 serve to identify what objects are suitable candidates for pre-initialization and serialization processing. For example, a rule may state that when the number of bytes of instructions used to initialize a candidate constant is greater than a number of bytes of instructions that would be consumed by using the pre-initialized object, the serialization process should be used. In another example, a rule may state that when the number of constantpool entries consumed by the constant initialization is greater than a number of constantpool entries that would be consumed by using the pre-initialized object, the serialization process should be used. In another example, a rule may state that when the number of entries in a constant array is greater than a serialized threshold value (for example, greater than 4 items in an array constant), the serialization process should be used. A rule may also be some combination of rules, for example a combination of one or more of the previously-described examples, thereby providing extended conditions to filter the set of proposed constants.

Serialized resource 304, in the current example, is represented as a single file, however the resource is a data structure containing a number of entries. The entries represent information defining the structure of the resource and the content (such as each serialized resource object). A number of suitable formats are typically available and one may be used as needed for a specific implementation. For example, a simple file may be used within which are comma-separated values representing a number of entries, a length per entry, and each serialized object entry. Other more complex structures may be used equally well. In other examples, a unique file may be generated for each serialized constant or some combination of unique files for each constant and multiple constants per file can be used.

Figure 4:
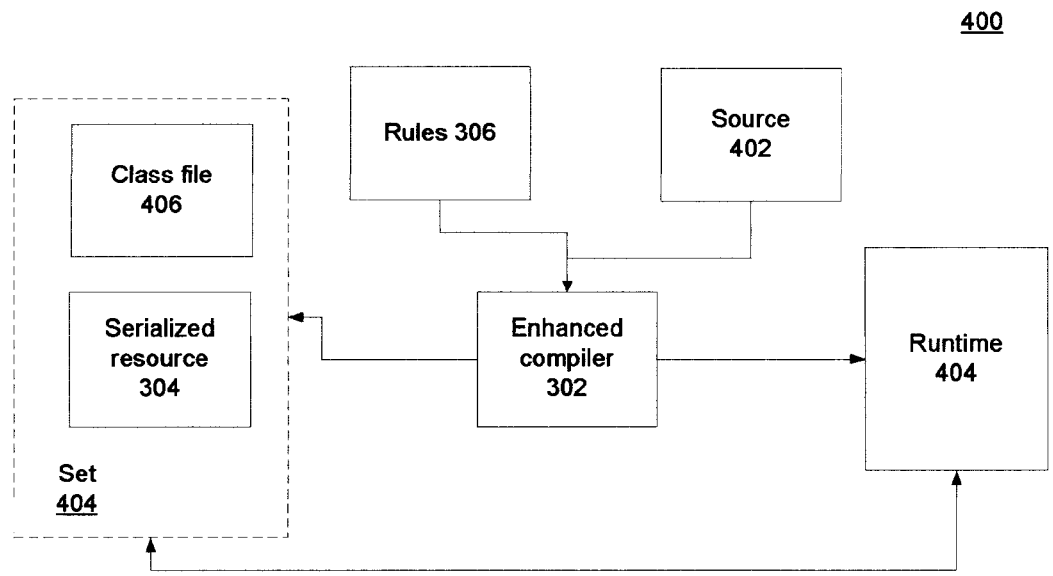
FIG. 4 is a block diagram of a logical view of an initialization system, in accordance with various embodiments of the disclosure.

With reference to FIG. 4, a block diagram of a logical view of an initialization system in accordance with various embodiments of the disclosure is presented. View 400 is an example of using components of initialization system 300 of FIG. 3.

Enhanced compiler, 302 using rules 306 (each of FIG. 3) to identify candidate objects for a serialization operation, consumes source 402. Enhanced compiler 302 generates class file 406 and associated serialized resource 304 of FIG. 3 to form set 404.

When using the embodiment of the disclosed process, the constant is only created and loaded when the constant is actually used. The embodiment of the disclosed process does not require creation of additional classes and accordingly provides a typically lighter-weight solution than previous attempts. An embodiment of the disclosed process is typically implemented using a single bytecode (instruction) at each use site as a replacement for code of the constant (which may be one or more instructions), and a small method to deserialize elements of the associated resource file. The small method may be generated by the compiler as part of the serialization process or be maintained as a typical portion of the runtime (such that no enhanced runtime support is required).

In one example, array initializers typically require a large number of bytecodes and a lengthy execution time. Array initializers can be recognized from bytecode idioms, for example, as in the following source code snippet:

```
iconst <array size>    // push the array size
newarray T_BYTE        // create the array
dup                    // copy the array
iconst 0               // push the index
bipush <val_1>         // push the value
bastore                // store value
dup                    // copy the array
iconst 1               // push the index
bipush <val_2>         // push the value
bastore                // store value
...
```

The example also indicates four instructions repeated for each byte stored to show that array initializers typically present challenges associated with footprint size and, accordingly, performance. With regard to footprint size (space efficiency), space is occupied by the byte array in memory, but also again in code space wherein each initialization instruction typically consumes multiple bytes. Running Java code, often at class initialization where a just-in-time compiler (JIT) cannot be used effectively, to generate a construct that could be created by the Java virtual machine (JVM) typically leaves a performance opportunity untapped.

A typical Java compiler, such as enhanced compiler 302 of FIG. 3, can recognize this kind of pattern, using rules 306, also of FIG. 3, and simulate the resulting bytecodes at compile time, thereby pre-initializing the object. The object is then serialized out into a resource file, shown as serialized resource 304, also of FIG. 3, which is named appropriately to avoid collisions with any other serialized resource files. For example, an appropriate naming uses a fully-qualified class name appended with _serialized because the Java environment guarantees uniqueness of class names.

The example code snippet shown previously may be replaced with a set of dynamic instructions (one dynamic instruction per use site per constant referenced). Accordingly, a block of instructions is typically reduced to a set of dynamic instructions, with further savings attained when the objects are not referenced at all. Object creation is only performed when the constant is used and accordingly, any constants on unused paths will not be created.

Using embodiments of the disclosed process, objects are created at compile time and deserialized at runtime. Instruction replacement typically aids in reducing footprint issues associated with a large amount of bytecode that is necessary to initialize the array. Performance improvements are typically available because instruction replacement associated with candidate objects moves code out of the class initialization <clinit> method, enabling a just-in-time compiler to optimize the code, whereas such optimization was not previously available.

Embodiments of the disclosed process typically require less code to implement, and without the additional class per constant, than previous solutions. Further, embodiments of the disclosed process do not rely on an end user to implement a pattern correctly unlike the requirement in double check locking of previous solutions, because programmatic rules are used to identify candidate code for processing.

Figure 5:
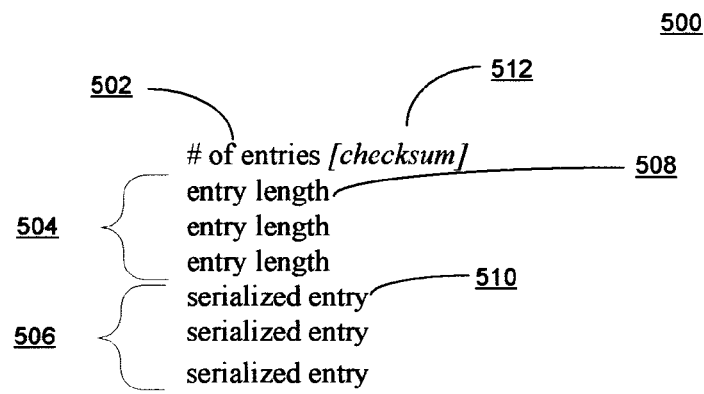
FIG. 5 is a textual representation of a resource file, in accordance with various embodiments of the disclosure.

With reference to FIG. 5, a textual representation of a resource file in accordance with various embodiments of the disclosure is presented. Resource 500 is an example of a portion of a data structure representing a resource file 304 created using initialization system 300 of FIG. 3.

The illustrative embodiment of the disclosed process uses a data structure, associated with a respective class, to contain a plurality of serialized entries for the respective class. For example, the data structure (when implemented as a single file) includes a number of elements, including a first entry of element 502 indicating a number of entries contained within the data structure.

The first entry is followed by a series of entries 504, each identifying a length (number of bytes) of a corresponding entry. For example, element 508 identifies a length of a corresponding entry, element 510. Another set of entries 506 comprises a set of entries such as element 510 representing a serialized entry in the resource file.

The example includes use of an optional component representing a [checksum] value in the form of element 512. Use of a checksum may be helpful when necessary to guard against a mismatch between the file and an associated respective class. A checksum (element 512) can be added optionally, after element 502 in the example file, and encoded in the set of static arguments for a given bootstrap method to help maintain version integrity between the serialized objects and the corresponding class file. For example, when using an appropriate choice of checksum function (such as the well-known md5 or sha1 or sha2 functions), the likelihood of accidental collisions quickly approaches zero. Using a different file format, an individual checksum for each constant can also be calculated and stored in the respective file format.

Each reference to a resulting object in the compiled code can be replaced with an ldbl instruction or invokedynamic instruction that uses a respective bootstrap method handle (BSM) to deserialize the object and place the deserialized object on the stack. When using ldbl instruction, only referring to the same literal pool index is required. When using invokedynamic instruction, and requiring returned objects to be identically equal, additional overhead is incurred to ensure the same object is returned; otherwise, each use can deserialize the object as required.

The bootstrap method is generated by the compiler, is optionally marked as synthetic, and may be named using exotic identifier syntax to avoid conflict with regular Java method names. In either case, when unique objects are required per invocation, the compiler can deserialize the object each time the object is needed. Alternatively, when the object is cloneable, the compiler generates a prototype object and calls clone on the object each time a unique instance is required.

Class initialization typically provides a capability for thread-safe initialization of a shared resource without synchronization or volatiles. Embodiments of the disclosed process hide initialization behind a use of invokedynamic or a use of ldbl. The hiding ensures all threads that race to initialize a value will see the same deserialized value, though each may run the deserialization code. Also, since a pre-computed value is deserialized, each request returns the same result (which invokedynamic ensures), and which requester performs the deserialization should not affect the outcome. When an embodiment of the disclosed process uses volatiles or synchronization in the bootstrap method, only the bootstrap is affected, not access to a resolved value, and therefore scalability is not hindered.

Although the example provided is specific to array objects, the disclosed process is applicable to other types of serializable objects. For example, a hash table comprising a set of key/value pairs may be serialized using the disclosed process. In general, the disclosed process is typically used in situations in which the objects can be efficiently represented in a data file. Efficient, in this sense, typically implies less space and less processing overhead.

For example, storing serialized data as an attribute or annotation inside a class file is feasible, but probably not as useful. Java code does not have access to attributes stored in the .class file and adding reflective access to attributes would typically require many changes to a virtual machine implementation. Due to the way attributes are specified, working with object attributes at the Java level would therefore prove to be difficult. While working with data stored in an annotation rather than an attribute may be easier, runtime costs would typically increase because the annotation data forces loading of additional classes and requires serialized data to always be present in the memory. The annotation class or classes have to be loaded, and each class that declares annotation(s) requires additional memory at runtime to hold the serialized data.

In contrast, embodiments of the disclosed process typically have a minimal footprint because of enablement to load data only when used and discarding of the serialized form from memory after deserialization. Embodiments of the disclosed process are implemented using straightforward Java code without change to a virtual machine implementation and provide a capability for any bytecoded language to expand inherent support for efficient literals, where efficient refers to a number of generated instructions that is O(n) in the number of literals, rather than the size of the respective literals. (The O(n) notation indicates that performance of embodiments of the disclosed process is typically directly proportional to the size of the data set being processed.)

In the absence of embodiments of the disclosed process, such support would be limited to whatever a bytecode format permits for literals. Embodiments of the disclosed process provide a capability for any element a programming language permits to be serialized, regardless of support from underlying bytecode format, accordingly providing a broader scope.

With reference to FIG. 6, a textual representation of a class file compilation in accordance with various embodiments of the disclosure is presented. Class file 600 is an example of a compilation of a source code portion as follows:

```
public class ConstantExample {
    static float floatConstant[ ] = { 1.1f, 2.2f, 3.3f, 4.4f, 5.5f, 6.6f,
    7.7f };
    public static float getConstantAt(int index) {
        return floatConstant[index];
    }
}
```
in a current solution.

The compiler compiles the source code to create class file 600 without using the disclosed process of initialization system 300 of FIG. 3. Compiled class ConstantExample 602 comprises constant pool 606, containing 23 constant pool entries, and uses a static class initialization method, <clinit> method 604, with 43 bytecodes that create float array 608. Compiled class ConstantExample 602 uses the following code in getConstantAt method 610 to get float array 608: 0: getstatic #17//Field floatConstant:[F (as shown at 612 in FIG. 6).

With reference to FIG. 7, a textual representation of a class file compilation in accordance with various embodiments of the disclosure is presented. Class file 700 is an example of a compilation of a source code portion as previously shown, however using initialization system 300 of FIG. 3 in this example.

The compiler compiles the source code to create a compiled class file of ConstantExample 702 using the disclosed process of initialization system 300 of FIG. 3. The compiled class comprises 24 constant pool entries 706, as compared with 23 constant pool entries using a previous solution of the compiled class file of ConstantExample 602 of FIG. 6. Further, compiled class ConstantExample 702 does not require the static class initialization method (<clinit> method 604) of the previous solution of compiled class file of ConstantExample 602 of FIG. 6 because all of the array constant initialization has occurred at compile time. Bootstrap methods 704 are also added in this example version of the compiled class, whereas bootstrap methods were not present in the previous example of FIG. 6. Compiled class ConstantExample 702 uses the following code in the getConstantAt method 710 to obtain the deserialized float array: 0: invokedynamic #22, 0//InvokeDynamic #0: ConstantExample_serialized: ( )[F (as shown at 712 in FIG. 7). The compiler also produces a small data file (not shown), representing the serialized resources, which occupies 61 bytes on disk for this example.

In another larger representative example, a 1000 element double array results in a representative size of a conventional class file of 21,330 bytes. When using the disclosed process of initialization system 300 of FIG. 3, a class file of 489 bytes in association with a serialized data file of 8,031 bytes was produced, for a savings of 12,810 bytes over the storage requirements of a typical previous solution.

With reference to FIG. 8, a textual representation of a class file compilation including a checksum in accordance with various embodiments of the disclosure is presented. Class file 800 is an example of an alternative compilation of a source code portion as previously shown, using initialization system 300 of FIG. 3 in this example.

The compiler compiles the source code to create compiled class file of ChecksumExample 802 using the disclosed process of initialization system 300 of FIG. 3. The compiled class comprises 26 constant pool entries 810, as compared with 23 constant pool entries using a previous solution to create the compiled class file of ConstantExample 602 of FIG. 6. Further, compiled class file of ChecksumExample 802 does not require the static class initialization method (<clinit> method 604) of the previous solution of ConstantExample 602 of FIG. 6 because all of the array constant initialization occurs at compile time in compiled class file of ChecksumExample 802. Bootstrap methods 804 are also evident in this example version of the compiled class, whereas bootstrap methods were not present in the previous example of FIG. 6. Compiled class file of ChecksumExample 802 uses the following code in getConstantAt method 812 to obtain the deserialized float array: 0: invokedynamic #24, 0//InvokeDynamic #0: ChecksumExample serialized: ( )[F (as shown at 816 in FIG. 8).

The optional checksum, when used, is typically a further means of ensuring integrity between a compiled form of a class and associated resources of the class. In the current example, compiled class file of ChecksumExample 802 includes two static arguments in item 0 of the Bootstrap-Methods 804 attribute. The first item, item 806, contains values of #18 0 representing an index in the resource file of the serialized constant that will be deserialized when the invokedynamic instruction in getConstantAt method 812 is invoked for the first time. The second item, item 808, contains values of #20 fd188f848e3befbd3b5ba7b525508067 representing a checksum value used to validate a corresponding resource file to ensure that no modification has occurred since the compiled class file of ChecksumExample.class (compiled class file of ChecksumExample 802) was created. In other examples, the checksum may be used to validate individual serialized constants rather than an entire resource file.

Figure 9:
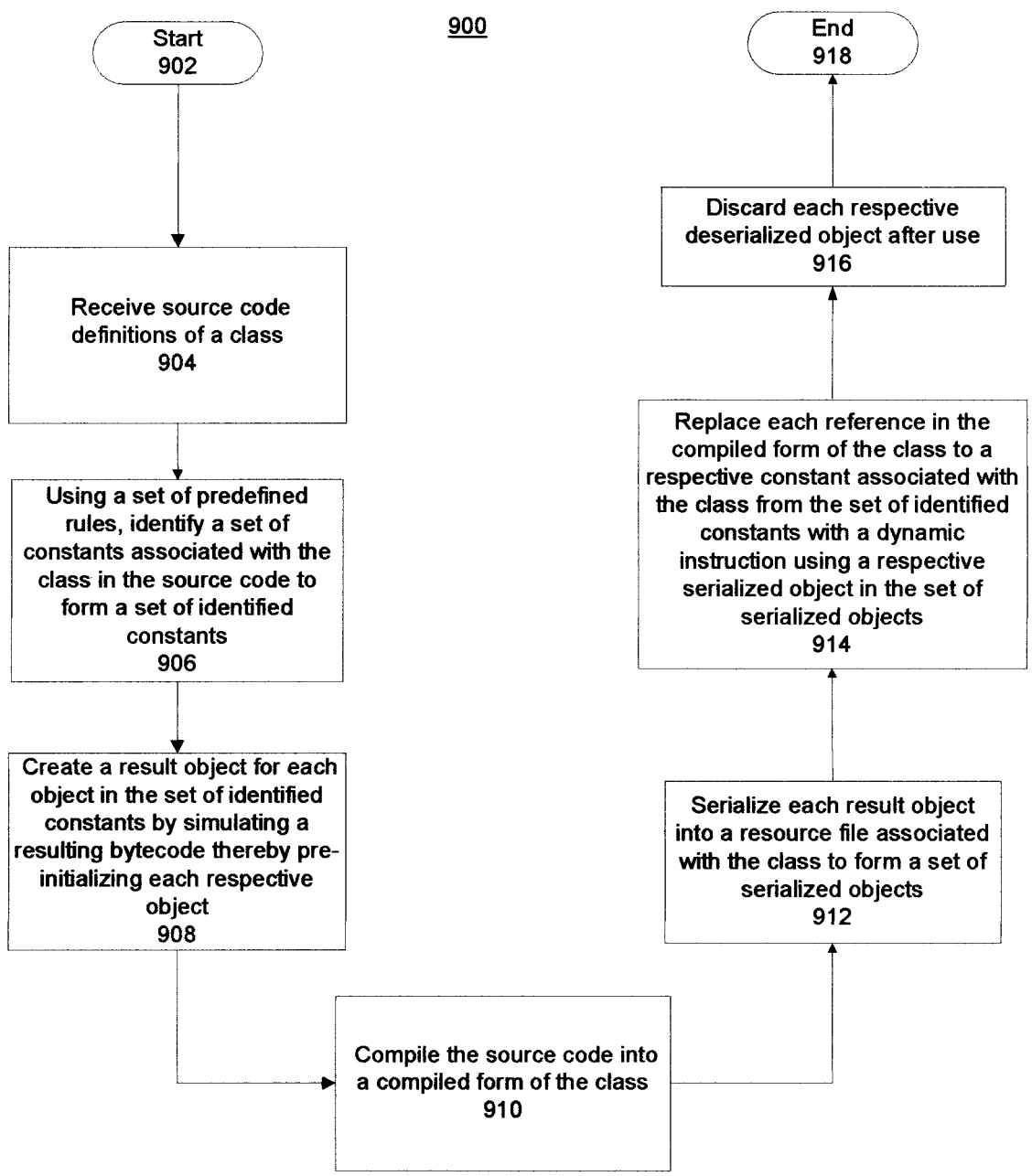
FIG. 9 is a flowchart of an initialization process using the initialization system of FIG. 3, in accordance with various embodiments of the disclosure.

With reference to FIG. 9, a flowchart of an initialization process in accordance with various embodiments of the disclosure is presented. Process 900 is an example of an initialization process using initialization system 300 of FIG. 3.

Process 900 begins (step 902) and receives a source code definition of one or more class (step 904). Process 900 identifies, using a set of rules, a set of constants associated with the class in the source code to form a set of identified constants (step 906). The source code received contains program language statements defining a set of classes, wherein the set comprises one or more classes, with each class typically having a form of constant defined for use. The set of pre-defined rules provides a selection of one or more rules used to filter or identify constants for serialization processing. While all serializable objects may be candidates for processing, some are filtered out, for example because of a high overhead to establish a serialized object when compared to the benefit attained.

Process 900 creates a result object corresponding to each constant in the set of identified constants by simulating a resulting bytecode, thereby pre-initializing each respective object (step 908). Process 900 compiles the source code into a compiled form of the class (step 910). The source code may contain definitions for one or more classes. Process 900 serializes each result object into one or more resource files associated with a respective class of the one or more classes to form a set of serialized objects, by class (step 912). During a compilation operation, the compiler generates a data structure used to contain the set of serialized objects. The data structure of the example is a file but may be other forms of storage structures as needed to contain the results of serialization. For example, a memory may be used to contain a list of members as indicated in the description of a serialized resource of FIG. 3 or FIG. 5. A data structure is created and associated with each class for which serialized objects are created. In one example, Java naming conventions ensure that an affinity between the class and the resource file is maintained while uniqueness of named structures is also preserved. In other examples, a unique file may be generated for each serialized constant or some combination of unique files for each constant and multiple constants per file can be used.

Process 900 replaces, in the compiled form of the class, each reference to a respective constant associated with a class from the set of identified constants with a corresponding dynamic instruction using a respective corresponding serialized object in the set of serialized objects (step 914). A referent portion of the compiled code may comprise a block of instructions, such as the previous example of array initialization. The corresponding dynamic instruction replaces a single instance of constant use.

Process 900 discards each respective deserialized object after use (step 916) and terminates thereafter (step 918). A small footprint is typically maintained by not maintaining the serialized form in memory, except as required by deserialization. Similar to only loading upon use, discarding upon completion of use minimizes space requirements to an amount needed to support only active objects.

Thus is presented in an illustrative embodiment a computer-implemented process for serialization of pre-initialized objects. The computer-implemented process receives a source code definition of a class, identifies a set of constants associated with the class in the source code to form a set of identified constants, creates a result object corresponding to each constant in the set of identified constants, and compiles the source code into a compiled form of the class. The computer-implemented process further serializes each result object into a resource file associated with the class to form a set of serialized objects and replaces, in the compiled form of the class, each reference to a respective constant associated with the class from the set of identified constants with a corresponding dynamic instruction using a respective serialized object in the set of serialized objects.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the blocks might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As noted earlier, the invention can take the form of an entirely hardware embodiment, an entirely software embodiment, or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer-readable medium of instructions and in a variety of forms, and that the present invention applies equally regardless of the particular type of signal-bearing media actually used to carry out the distribution. As noted earlier, computer-readable media may comprise computer-readable storage media or computer-readable signal media. The computer-readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented process for serialization of pre-initialized objects, the computer-implemented process comprising:
    receiving a source code definition of a class;
    programmatically evaluating the received source code definition to identify therein each of a plurality of constants associated with the class in the source code;
    creating a result object corresponding to each of the plurality of identified constants, each result object representing a value of the corresponding identified constant;
    compiling the source code into a compiled form of the class;
    serializing each result object into a resource file associated with the class, thereby forming a set of serialized objects; and
    replacing, in the compiled form of the class, each reference to any of the plurality of identified constants with a corresponding dynamic instruction that, when executed at run-time, will dynamically provide the value of the identified constant, within the compiled form of the class, from the corresponding serialized object in the set of serialized objects.

2. The computer-implemented process of claim 1, wherein the programmatically evaluating further comprises:
    comparing the source code definition to a set of predefined rules, wherein rules in the set define how to identify a particular type of constant for which a result object is to be created and serialized.

3. The computer-implemented process of claim 1, wherein creating the result object further comprises:
    generating bytecodes that pre-initialize the result object.

4. The computer-implemented process of claim 1, wherein compiling the source code further comprises:
    generating, in the compiled form of the class, a bootstrap method for deserializing any selected one of the serialized objects from the resource file and returning the deserialized object responsive to executing the dynamic instruction at run-time; and
    wherein the generating further comprises programmatically generating a unique name for the bootstrap method using an exotic identifier.

5. The computer-implemented process of claim 1, wherein the corresponding dynamic instruction comprises one of a ldbl instruction and an invokedynamic instruction.

6. The computer-implemented process of claim 1, wherein the compiled form of the class and the resource file associated with the class each include a checksum value that, upon a match thereof, verifies integrity of the resource file.

7. The computer-implemented process of claim 1, wherein the corresponding dynamic instruction executes, at run-time, to bootstrap
    each of the respective constants on a first use of the constant by deserializing the respective serialized object to obtain the stored value, and executes on any subsequent use of the constant to obtain the previously-deserialized stored value.

8. A computer program product for serialization of pre-initialized objects, the computer program product comprising:
    a non-transitory computer-readable storage media containing computer-executable program code stored thereon, the computer-executable program code configured for:
    receiving a source code definition of a class;
    programmatically evaluating the received source code definition to identify therein each of a plurality of constants associated with the class in the source code;
    creating a result object corresponding to each of the plurality of identified constants, each result object representing a value of the corresponding identified constant;
    compiling the source code into a compiled form of the class;
    serializing each result object into a source file associated with the class, thereby forming a set of serialized objects; and
    replacing, in the compiled form of the class, each reference to any of the plurality of identified constants with a corresponding dynamic instruction that, when executed at run-time, will dynamically provide the value of the identified constant, within the compiled form of the class, from the corresponding serialized object in the set of serialized object.

9. The computer program product of claim 8, wherein the programmatically evaluating further comprises:
    comparing the source code definition to a set of predefined rules, wherein rules in the set define how to identify a particular type of constant for which a result object is to be created and serialized.

10. The computer program product of claim 8, wherein creating the result object further comprises:
    generating bytecodes that pre-initialize the result object.

11. The computer program product of claim 8, wherein compiling the source code further comprises:
    generating, in the compiled form of the class, a bootstrap method for deserializing any selected one of the serialized objects from the resource file and returning the deserialized object responsive to executing the dynamic instruction at run-time; and
    wherein the generating further comprises programmatically generating a unique name for the bootstrap method using an exotic identifier.

12. The computer program product of claim 8, wherein the corresponding dynamic instruction comprises one of a ldbl instruction and an invokedynamic instruction.

13. The computer program product of claim 8, wherein compiling the source code further comprises:
    including a checksum value with the compiled form of the class and the resource file associated with the class that, upon a match thereof, verifies integrity of the resource file.

14. The computer program product of claim 8, wherein the corresponding dynamic instruction executes, at run-time, to bootstrap each of the respective constants on a first use of the constant by deserializing the respective serialized object to obtain the stored value, and executes on any subsequent use of the constant to obtain the previously-deserialized stored value.

15. An apparatus for serialization of pre-initialized objects, the apparatus comprising:
    a communications fabric;
    a memory connected to the communications fabric, wherein the memory contains computer-executable program code;
    a communications unit connected to the communications fabric;
    an input/output unit connected to the communications fabric;
    a display connected to the communications fabric; and
    a processor unit connected to the communications fabric, wherein the processor unit executes the computer-executable program code to direct the apparatus to:
    receive a source code definition of a class;
    programmatically evaluate the received source code definition to identify therein each of a plurality of constants associated with the class in the source code;
    create a result object corresponding to each of the plurality of identified constants, each result object representing a value of the corresponding identified constant;
    compile the source code into a compiled form of the class;
    serialize each result object into a resource file associated with the class, thereby forming a set of serialized objects; and
    replace, in the compiled form of the class, each reference to any of the plurality of identified constants with a corresponding dynamic instruction that, when executed at run-time, will dynamically provide the value of the identified constant, within the compiled form of the class, from the corresponding serialized object in the set of serialized objects.

16. The apparatus of claim 15, wherein the programmatically evaluating further comprises:
    comparing the source code definition to a set of predefined rules, wherein rules in the set define how to identify a particular type of constant for which a result object is to be created and serialized.

17. The apparatus of claim 15, wherein creating the result object further comprises:
    generating bytecodes that pre-initialize the result object.

18. The apparatus of claim 15, wherein compiling the source code further comprises:
    generating, in the compiled form of the class, a bootstrap method for deserializing any selected one of the serialized objects from the resource file and returning the deserialized object responsive to executing the dynamic instruction at run-time; and
    wherein the generating further comprises programmatically generating a unique name for the bootstrap method using an exotic identifier.

19. The apparatus of claim 15, wherein
    the corresponding dynamic instruction comprises one of a ldbl instruction and an invokedynamic instruction.

20. The apparatus of claim 15, wherein the corresponding dynamic instruction executes, at run-time, to bootstrap each of the respective constants on a first use of the constant by deserializing the respective serialized object to obtain the stored value, and executes on any subsequent use of the constant to obtain the previously-deserialized stored value.

* * * * *